United States Patent Office 2,888,413
Patented May 26, 1959

2,888,413

PREPARATION OF FLEXIBLE ELASTOMERIC CELLULAR POLYURETHANE MATERIALS

Henry A. Pace, Akron, Ohio, assignor to The Goodyear Tire & Rubber Company, Akron, Ohio, a corporation of Ohio No Drawing. Application December 21, 1955
Serial No. 554,422

7 Claims. (Cl. 260—2.5)

This invention relates broadly to the preparation of flexible elastomeric cellular materials. More particularly, it relates to methods for preparing flexible elastomeric cellular structures formed from liquid reaction mixtures containing tolylene diisocyanate and active-hydrogen-containing polymeric materials and to improved products obtained by the use of these methods.

In the production of flexible elastomeric cellular structures from liquid polymeric reaction mixtures containing polyisocyanates the reaction mixtures contain polymeric materials which are either liquid at room temperature or capable of being melted at rather low temperatures. These polymeric materials possess active-hydrogen atoms which react with isocyanate groups of the polyisocyanates to form extended molecular chains. The polyisocyanate reactant performs a three-fold function in the reaction mixture. It operates to extend the chain length of the polymeric material, to react with the water in the formation of carbon dioxide gas and to cross-link or cure the chain-extended polymeric material. The carbon dioxide that is liberated by the reaction produces a foamed mixture which sets to an elastomeric flexible cellular structure.

By the term "active-hydrogen" used to describe the polymeric material is meant those hydrogen atoms which are reactive as measured and determined by the Zerewitinoff method. Examples of active-hydrogen-containing polymeric materials are polyesters, polyesteramides, and polyalkylene ether glycols.

The polyesters are prepared by the condensation of one or more glycols with one or more dibasic carboxylic acids. Polyesteramides are prepared from one or more glycols, one or more dibasic carboxylic acids and relatively small amounts of one or more bifunctional amino compounds such as amino carboxylic acids, amino alcohols and diamines. Small amounts of trifunctional materials may also be employed in the preparation of the polyesters and polyesteramides. The polyalkylene ether glycols are hydroxyl-terminated polyethers derived from alkylene oxides or glycols or from heterocyclic ethers, such as dioxolane. Further examples of these active-hydrogen-containing materials and methods for their preparation are described in U.S. Patents 2,625,531; 2,625,532; and 2,625,535 which show polyesteramides and polyesters, and U.S. Patents 2,692,873 and 2,702,797 which show polyalkylene ether glycols. Preferred active-hydrogen-containing materials useful in the practice of this invention are polyesters and polyesteramides having an average molecular weight of from approximately 750 to 2,250, an acid number not greater than 5, and an hydroxyl number from 50 to 150. Best results are obtained with an active-hydrogen-containing polymeric material, having an acid number not greater than 2, an hydroxyl number of approximately 60, and a corresponding average molecular weight of approximately 1,900. It is also preferred that these polymers be substantially anhydrous and contain not more than 0.2 percent water by weight.

Although any organic polyisocyanate or mixtures of polyisocyanates may be employed to produce the elastomeric flexible cellular structures, the practice of this invention is directed to the preparation of these materials using tolylene diisocyanate and particularly 2,4-tolylene diisocyanate. The amount of polyisocyanate should be sufficient to chain-extend and cross-link the polymeric material and to react with water to form carbon dioxide gas. In general, from 2 to 8 equivalents of isocyanate per mol of polymeric material may be employed with best results being obtained by the use of approximately 3 mols of diisocyanate per mol of polymeric material.

Since the reaction mixture is liquid at the time when the carbon dioxide gas is generated to produce the desired cellular structure, the control of the generation of the carbon dioxide gas so as to minimize shrinkage in and collapse of the cured cellular product is desired. The polymeric material in the reaction mixture is a viscous liquid which, as the chain-extension and cross-linking reactions proceed, progressively becomes more viscous until finally it forms the solid network for the resilient cellular finished product. If the generation of the carbon dioxide occurs before the polymeric material becomes sufficiently viscous and before it possesses sufficient internal strength to prevent the generated gas from escaping from the reaction mixture, collapse or shrinkage of the cured material will result. This collapse results in a product having non-uniform density and a relatively thick skin of non-porous material on the surface. If, on the other hand, the gas is generated late in the course of the reaction, at which time the polymeric material has been chain-extended and partially cross-linked, the expansion of the reaction mixture is hindered with the result that the late-evolved gas diffuses through the mass and creates a finished cellular material of high density.

One method for minimizing the collapse in the finished structures has been described in my copending application Serial Number 508,323, filed May 13, 1955, wherein it is disclosed that the removal of the initial exothermic heat of reaction by the formation of a prepolymer will aid in the preparation of cellular products having the desired properties.

It has also been observed that, if the 2,4 isomer of tolylene diisocyanate is used alone in preparing the flexible cellular materials, there is a tendency for the finished cured foam to collapse because of the premature evolution of carbon dioxide gas. The use of blends of the 2,6 and the 2,4 isomers of tolylene diisocyanate has minimized this tendency to collapse, probably because of the slower reaction rate of the 2,6 isomer in the process. Another problem in the production of these cellular products is the development of cracks or fissures in the cured material.

The broad object of this invention is to provide a method of producing a flexible elastomeric cellular structure using the 2,4 isomer of toluene diisocyanate, without addition of other isomers, the reaction mixtures also comprising an active-hydrogen-containing material and water. Another object is to provide a method to produce a uniform, high quality foamed cellular material from these reaction mixtures. It is also an object to control the generation of carbon dioxide to prevent collapse in foams produced from these reaction mixtures. Still another object is to provide a method for the production of flexible cellular materials which do not contain cracks or fissures.

The objects of this invention are accomplished by the incorporation of small quantities of castor oil in the reaction mixture. It has been found that collapse of the finished product, sometimes encountered where the 2,4 isomer of tolylene diisocyanate is used by itself, can be prevented by the incorporation of from 0.5 to 3.0 parts of castor oil by weight per 100 parts of the active-hydrogen-containing polymeric material. This castor oil may be incorporated after the prepolymer (described in my copending application Serial Number 508,323, filed May 13, 1955) is formed, in the foaming step of the reaction or it may even be added in both steps. It is preferred to use from 0.90 to 2.00 parts of the castor oil per 100 parts of active-hydrogen-containing polymeric material.

The following reaction mixtures were prepared for use in illustrating the practice of this invention. Parts are shown by weight.

PREPARATION OF POLYESTER

A polyester was prepared by the condensation reaction of 1 mol of adipic acid with approximately ⅓ mol ethylene glycol, ⅓ mol diethylene glycol and ⅓ mol of butylene glycol. This polyester had a hydroxyl number of 60 and an acid number of 2.

PREPARATION OF PREPOLYMER 1 FROM 2,4-TOLYLENE DIISOCYANATE

To 700 parts of the polyester prepared as described above was added 68 parts of 2,4-tolylene diisocyanate. This reaction mixture was stirred in a closed flask at a water bath temperature of 60° C. for approximately 35 minutes, during which time the reaction temperature rose gradually to approximately 65° C. after 13 minutes and subsequently fell off to 63° C. after 35 minutes. The prepolymer resulting from this reaction was cooled to room temperature.

PREPARATION OF PREPOLYMER 2 FROM 2,4/2,6-TOLYLENE DIISOCYANATE MIXTURE

To 700 parts of the polyester prepared as described above was added 68 parts of a mixture of tolylene diisocyanates containing approximately 75% of the 2,4 isomer by weight and approximately 25% of the 2,6 isomer by weight. This reaction mixture was stirred in a closed flask at a water bath temperature of 60° C. for approximately 35 minutes, during which time the reaction temperature rose gradually to approximately 65° C. after 13 minutes and subsequently fell off to 63° C. after 35 minutes. The prepolymer resulting from this reaction was cooled to room temperature.

PREPARATION OF PREPOLYMER 3 FROM 2,4-TOLYLENE DIISOCYANATE AND CASTOR OIL

To 700 parts of the polyester prepared as described above was added 68 parts of 2,4-tolylene diisocyanate and 7 parts of castor oil. This reaction mixture was stirred in a closed flask at a water bath temperature of 60° C. for approximately 35 minutes, during which time the reaction temperature rose gradually to approximately 65° C. after 13 minutes and subsequently fell off to 63° C. after 35 minutes. The prepolymer resulting from this reaction was cooled to room temperature.

The practice of this invention is further illustrated with respect to the following examples in which, unless otherwise specified, parts are shown by weight. These examples are to be interpreted as representative rather than restrictive of the scope of this invention.

*Example 1.—2,4-tolylene diisocyanate added to prepolymer made from 2,4-tolylene diisocyanate*

Prepolymer 1 (100 parts) was mixed with 18 parts of 2,4-tolylene diisocyanate, 2.75 parts of water, 0.5 cubic centimeter of N-methylmorpholine and 0.64 part of the condensation product of approximately 4 mols of butyraldehyde and 1 mol of aniline. The complete reaction mixture was thoroughly mixed and poured into a mold where the foaming of the reaction mixture was completed. After the reaction mixture rose in the mold to its maximum height it collapsed, leaving a layer of non-cellular material in the bottom of the mold.

*Example 2.—Mixed isomers added to prepolymer prepared from mixed isomers*

Prepolymer 2 (100 parts) was mixed with 18 parts of a mixture of tolylene diisocyanates containing approximately 75% by weight of 2,4-tolylene diisocyanate and approximately 25% by weight of 2,6-tolylene diisocyanate, 2.75 parts of water, 0.5 cubic centimeter of N-methylmorpholine and 0.64 part of the condensation product of approximately 4 mols of butyraldehyde and 1 mol of aniline. The complete reaction mixture was thoroughly mixed and poured into a mold where the foaming reaction mixture expanded and cured to produce a high quality flexible cellular material.

*Example 3.—2,4-tolylene diisocyanate added to prepolymer containing castor oil*

Prepolymer 3 (100 parts) was mixed with the same ingredients and in accordance with the procedure described in Example 1. After the complete reaction mixture had been well blended it was poured into a mold where the reaction mixture expanded and cured to produce a high quality flexible cellular material.

*Example 4.—2,4-tolylene diisocyanate and castor oil added to prepolymer made from 2,4-tolylene diisocyanate*

The same method was followed as described in Example 1 except that 0.92 part by weight of castor oil per 100 parts by weight of the prepolymer was added along with the diisocyanate, water and catalysts. This complete reaction mixture was foamed and cured to produce a high quality flexible elastomeric cellular product.

*Example 5.—Castor oil in prepolymer and in foaming step*

The same procedure was followed as in Example 3 except that 0.92 part by weight of castor oil per 100 parts by weight of prepolymer was added to the reaction mixture along with the diisocyanate, water and catalysts. The complete reaction mixture was permitted to foam and cure to produce a high quality flexible elastomeric cellular product.

It will be observed that each of the examples, except Example 1, gave a flexible cellular product of high quality, the conditions in each example being substantially the same save for the variables to be tested. Example 1 contained no 2,6-tolylene/diisocyanate and no castor oil. Example 2 employed a mixture of 2,6-tolylene/diisocyanate with 2,4-tolylene diisocyanate in order to achieve a satisfactory foamed product. In Example 3, however, an equally satisfactory product was obtained by employing only the 2,4-tolylene diisocyanate and a prepolymer to which castor oil had been added. Likewise, castor oil was used in Example 4, this time being added at the time of foaming, rather than in the prepolymer as in Example 3. Example 5 calls for the presence of castor oil both in the prepolymer and at the time of foaming.

Physical tests were determined for each of the cured samples produced according to Examples 2 through 5. Physical data could not be determined on Example 1 because the cellular material collapsed. The results of these physical tests (which are the average values for from 2 to 6 individual test runs on each example) are shown in Table I below in which density is represented in pounds per cubic foot, tensile strength in pounds per square inch, elongation in percent at break, and compression in pounds. The compression values are determined by measuring the force in pounds required to compress 50 square inches of the cellular material to 75% of its original thickness. The method of conducting this test is described on page 2 of The Rubber Manufacturers Association Specification for Latex, dated April 1, 1953. The value T/D is the ratio of tensile strength to density, lower densities being obviously desirable in a foamed article provided the requisite strength is attained.

TABLE I

| Example | Density | Tensile Strength | Percent Elongation at Break | Compression | T/D Ratio |
|---|---|---|---|---|---|
| 2 | 4.53 | 30.2 | 320 | 64.5 | 6.7 |
| 3 | 3.09 | 35.0 | 563 | 46.0 | 11.4 |
| 4 | 3.40 | 44.5 | 583 | 67.5 | 13.1 |
| 5 | 3.70 | 38.5 | 555 | 57.0 | 10.2 |

Analysis of the results set forth in the above table shows that the use of 2,6-tolylene/diisocyanate, as in Example 2, results in a product of satisfactory physical characteristics. However, the foamed products obtained by the use of castor oil, as in Examples 3, 4, and 5 have even better properties. The density is lower than in Example 2 while the tensile strength has been increased. Also the extent to which the foamed product can be stretched before breaking has been increased markedly by the presence of castor oil.

Thus, the use of castor oil in combination with 2,4-tolylene diisocyanate in the formation of the prepolymer, in the foaming and curing step or in both reactions produces a lower density cellular material which has improved tensile strength and elongation values as compared to cellular materials using 2,4-tolylene diisocyanate in combination with 2,6-tolylene diisocyanate.

While certain representative embodiments and details have been shown for the purpose of illustrating the invention, it will be apparent to those skilled in this art that various changes and modifications may be made therein without departing from the spirit or scope of the invention.

I claim:

1. In the process of preparing a flexible elastomeric cellular material from the reaction of 2,4-tolylene diisocyanate, water, and an active-hydrogen-containing polymeric material selected from the group consisting of polyesters, polyesteramides and poly alkylene ether glycols having an average molecular weight of from 750 to 2,250 and a hydroxyl number of from 50 to 150 and said polyesters and polyesteramides having an acid number not greater than 5, said polyesters being prepared by the condensation of at least one glycol with at least one dicarboxylic acid, said polyesteramides being prepared from at least one glycol, at least one dicarboxylic acid and at least one bifunctional amino compound selected from the group consisting of amino carboxylic acids, amino alcohols and diamines, which process includes the steps of first forming a prepolymer by reacting said polymeric material containing not more than 0.2% water by weight with from 0.9 to 1.10 mols of 2,4-tolylene diisocyanate per mol of said polymeric material until the exothermic heat of reaction has been substantially evolved and removed from the reaction mixture, and then adding additional 2,4-tolylene diisocyanate and water to said prepolymer, and permitting the complete reaction mixture to expand and cure, the improvement which comprises conducting at least one of the diisocyanate reactions in the presence of from 0.5 to 3.0 parts castor oil per 100 parts by weight of said active-hydrogen-containing polymeric material.

2. In the process of preparing a flexible elastomeric cellular material as defined by claim 1, the improvement which comprises conducting at least one of the diisocyanate reactions in the presence of from 0.90 to 2.00 parts of castor oil per 100 parts by weight of the active-hydrogen-containing polymeric material.

3. The process of preparing a flexible elastomeric cellular material which comprises forming a prepolymer by reacting an active-hydrogen-containing polymeric material containing not more than 0.2% water by weight and being selected from the group consisting of polyesters, polyesteramides and polyalkylene ether glycols having an average molecular weight of from 750 to 2,250 and a hydroxyl number of from 50 to 150 and said polyesters and polyesteramides having an acid number not greater than 5, said polyesters being prepared by the condensation of at least one glycol with at least one dicarboxylic acid, said polyesteramides being prepared from at least one glycol, at least one dicarboxylic acid and at least one bifunctional amino compound selected from the group consisting of amino carboxylic acids, amino alcohols and diamines with from 0.90 to 1.10 mols of 2,4-tolylene diisocyanate per mol of said polymeric material in the presence of from 0.5 to 3.0 parts of castor oil per 100 parts by weight of said active-hydrogen-containing polymeric material, said reaction continuing until the exothermic heat of reaction has been substantially evolved and removed from the reaction mixture, adding additional 2,4-tolylene diisocyanate and water to said prepolymer and permitting the complete reaction mixture to expand and cure.

4. The process defined by claim 3 in which from 0.90 to 2.00 parts of castor oil per 100 parts by weight of the active-hydrogen-containing polymeric material are used.

5. The process of preparing a flexible elastomeric cellular material which comprises preparing a prepolymer by reacting an active-hydrogen-containing polymeric material containing not more than 0.2% water by weight and being selected from the group consisting of polyesters, polyesteramides and polyalkylene ether glycols having an average molecular weight of from 750 to 2,250 and a hydroxyl number of from 50 to 150 and said polyesters and polyesteramides having an acid number not greater than 5, said polyesters being prepared by the condensation of at least one glycol with at least one dicarboxylic acid, said polyesteramides being prepared from at least one glycol, at least one dicarboxylic acid and at least one bifunctional amino compound selected from the group consisting of amino carboxylic acids, amino alcohols and diamines with from 0.9 to 1.10 mols of 2,4-tolylene diisocyanate per mol of said polymeric material until the exothermic heat of reaction has been substantially evolved and removed from the reaction mixture, adding 2,4-tolylene diisocyanate, water, and from 0.5 to 3.0 parts of castor oil per 100 parts by weight of said active-hydrogen-containing polymeric material to said prepolymer and permitting the complete reaction mixture to expand and cure.

6. The process defined by claim 5 in which from 0.90 to 2.00 parts of castor oil per 100 parts by weight of the active-hydrogen-containing polymeric material are used.

7. In the process of preparing a flexible elastomeric cellular material from the reaction of 2,4-tolylene diisocyanate, water, and a polyester prepared from the condensation of at least one glycol and at least one dicarboxylic acid having an average molecular weight of approximately 1,900, a hydroxyl number of approximately 60 and an acid number not greater than 2, which process includes the steps of first forming a prepolymer by reacting said polyester containing not more than 0.2% water by weight with from 0.9 to 1.10 mols of 2,4-tolylene diisocyanate per mol of said polyester until the exothermic heat of reaction has been substantially evolved and removed from the reaction mixture and then adding additional 2,4-tolylene diisocyanate and water to said prepolymer and permitting the complete reaction mixture to expand and cure, the improvement which comprises conducting at least one of the diisocyanate reactions in the presence of from 0.9 to 2.0 parts of castor oil per 100 parts by weight of said polyester.

References Cited in the file of this patent

UNITED STATES PATENTS

| | | |
|---|---|---|
| 2,602,783 | Simon et al. | July 8, 1952 |
| 2,609,349 | Cass | Sept. 2, 1952 |
| 2,625,531 | Seeger | Jan 13, 1953 |
| 2,787,601 | Detrick et al. | Apr. 2, 1957 |

OTHER REFERENCES

De Bell et al.: "German Plastics Practice." Copyright 1946, published by De Bell and Richardson, Springfield, Mass., pages 463-4.

Chemical Engineering, volume 57, No. 4, April 1950, pages 165-6.